United States Patent [19]

Derndinger et al.

[11] Patent Number: 5,239,178
[45] Date of Patent: Aug. 24, 1993

[54] OPTICAL DEVICE WITH AN ILLUMINATING GRID AND DETECTOR GRID ARRANGED CONFOCALLY TO AN OBJECT

[75] Inventors: Eberhard Derndinger, Aalen; Rudolf E. Grosskopf, Konigsbronn; Klaus Knupfer, Essingen, all of Fed. Rep. of Germany

[73] Assignee: Carl Zeiss, Oberkochen, Fed. Rep. of Germany

[21] Appl. No.: 789,342

[22] Filed: Nov. 8, 1991

Related U.S. Application Data

[63] Continuation-in-part of Ser. No. 626,678, Dec. 12, 1990, abandoned.

[30] Foreign Application Priority Data

Nov. 10, 1990 [DE] Fed. Rep. of Germany ....... 4035799

[51] Int. Cl.$^5$ .............................................. H01J 3/14
[52] U.S. Cl. .................................. 250/234; 359/397
[58] Field of Search ................ 250/208.1, 203.1, 216, 250/236, 234, 571; 350/523, 526, 368, 209; 362/342, 319; 359/383, 389, 397

[56] References Cited

U.S. PATENT DOCUMENTS

| | | |
|---|---|---|
| 3,013,467 | 12/1961 | Minsky . |
| 3,076,890 | 2/1963 | Guter, Jr. ............................ 362/319 |
| 3,774,024 | 11/1973 | Deaton ............................ 362/342 |
| 4,129,775 | 12/1978 | O'Meara ............................ 250/203.1 |
| 4,407,008 | 9/1983 | Schmidt et al. . |
| 4,806,004 | 2/1989 | Wayland . |
| 4,827,125 | 5/1989 | Goldstein ............................ 250/234 |
| 4,873,653 | 10/1989 | Grosskopf . |
| 4,882,498 | 11/1989 | Cochran et al. .................... 250/571 |
| 5,028,802 | 7/1991 | Webb et al. .......................... 250/571 |
| 5,032,720 | 7/1991 | White ................................ 250/236 |
| 5,122,653 | 6/1992 | Ohki ................................ 250/216 |

FOREIGN PATENT DOCUMENTS

| | | |
|---|---|---|
| 320760 | 6/1989 | European Pat. Off. . |
| 273122 | 11/1989 | Fed. Rep. of Germany . |
| 03055510 | 5/1991 | Japan . |

OTHER PUBLICATIONS

Donnelly, J. P. et al., "Two-Dimensional Surface-Emitting Arrays of GaAs/AlGaAs Diode Lasers", SPIE, Laser Diode Technology and Applications, vol. 1043, 1989, pp. 92-99.

Hamilton, D. K. et al., "Three-Dimensional Surface Measurement Using the Confocal Scanning Microscope", Appl. Phys. B, vol. 27, 1982, pp. 211-213.

*Primary Examiner*—David C. Nelms
*Assistant Examiner*—Que T. Le
*Attorney, Agent, or Firm*—Fish & Richardson

[57] ABSTRACT

A device is described for three-dimensional examination with a confocal beam path, in which an illumination grid (12; 22; 31; 83) is imaged in a focal plane (13f; 87), said plane being located on or in the vicinity of surface (14o) of object (14). The radiation reflected in the focal plane is imaged directly by a beam splitter onto the receiving surface of a CCD receiver (17; 91). The illumination grid (12; 22; 31; 83) is then imaged on the receiver surface either by the photosensitive areas of the receiver acting as confocal diaphragms or by signals from the detector elements which only receive light scattered outside focal plane (13f; 87) not being taken into account in the evaluation or being taken into account separately.

The illumination grid size generated in focal plane (13f; 87) can be either fixed or variable. A variable illumination grid size can be produced for example by an LED array. The device also makes examinations in transmitted light possible.

31 Claims, 5 Drawing Sheets

OPTICAL DEVICE WITH AN ILLUMINATING GRID AND DETECTOR GRID ARRANGED CONFOCALLY TO AN OBJECT

CROSS-REFERENCE TO RELATED APPLICATIONS

This application is a continuation-in-part of U.S. Ser. No. 07/626,678, filed Dec. 12, 1990, now abandoned.

BACKGROUND OF THE INVENTION

The present invention relates to a device for three-dimensional examination of an object.

A device in the form of a confocal scanning microscope is described in a publication by D. K. Hamilton, et al. (Appl. Phys. B 27, 211 (1982)). Scanning microscopes with confocal beam paths, in which a so-called point light source is imaged on a plane of the object and this plane of the object is imaged on a so-called spot receiver or hole diaphragm behind which a receiver is located, have the property of being very height-selective, in other words of optically separating planes that are only a short distance apart. In the above publication, this property is used to record a surface profile of a semiconductor component. For this purpose, for each x-y position of the light spot, the object is moved in the z direction (direction of the optical axis) and the intensity curve is measured. Since the latter has a pronounced maximum when the image of the light spot is located precisely on the surface, the height of the surface in the z direction can be determined for every point in the x-y plane and the entire surface profile of the object can be recorded sequentially in this manner as a function of time.

One disadvantage of this known device is that the recording of a surface profile requires a relatively long time since only one individual object point is scanned at each point in time.

Moreover, a confocal microscope is known from U.S. Pat. No. 4,407,008 in which a one- or two-dimensional luminous diode array is imaged in the object plane. The light scattered or reflected at the object surface is then imaged on a one-dimensional or two-dimensional detector diode array. This microscope permits scanning an object without deflecting the light beam mechanically or moving the object, but here again only a single small area of the object is illuminated at each point in time so that once again a relatively long time is required to record a surface profile.

SUMMARY OF THE INVENTION

The goal of the present invention is to provide a device by which three-dimensional optical examinations can be conducted in a relatively short time.

The stated goal is achieved according to the invention by a device which features an illumination grid; a detector grid which includes a plurality of independent detector elements, whose center-to-center distances define a detector grid size; optical elements to image the illumination grid in a focal plane and to image the focal plane on the detector grid. In that device, the illumination grid generates several separate light spots or shadow zones simultaneously in the focal plane, whose center-to-center distances define an illumination grid size, and wherein either the image of the illumination grid size in the plane of the detector grid is larger than the detector grid size or the detector grid size is larger than the diameters and/or edge lengths of the photosensitive surfaces of the individual detector elements.

In the device according to the invention, the illumination grid simultaneously produces a plurality of separate light spots in the focal plane so that a correspondingly large number of object points can be measured simultaneously. The distance between the light spots, in other words the illumination grid size, roughly corresponds to two to ten times their diameter. This illumination grid scale is either imaged on the detector grid in such a way that the image of the illumination grid size is greater than the detector grid size or the detector grid is larger than the diameter or edge lengths of the photosensitive surfaces of the individual detector elements. In both alternative embodiments, the detector grid simultaneously serves as the detector and confocal grid. In the first case, the detector elements which in the case of a plane object positioned in the focal plane are located between the images of the illumination grid, act as a diaphragm by ignoring the output signals from these detectors in the further evaluation. In the second case, the insensitive areas between the detector elements act as confocal diaphragms.

It has been found that commercial CCD receivers are best suited as detector grids. The generally disadvantageous property of these sensors can then be put to use, namely that only a small part of the receiver surface consists of photosensitive areas. The distance between the individual detector elements is then about five to six times their diameter.

The use of a CCD receiver and a two-dimensional array of holes in an illuminated layer is known to be used in a scanning microscope according to U.S. Pat. No. 4,806,004. However, that patent merely states that the object can be observed in different layer planes. In particular, the diaphragm effect of the CCD receiver is not utilized, namely the fact that it consists of photosensitive areas arranged in a grid, whose dimensions are much smaller than their distances apart.

In the above-captioned U.S. Patent, the confocal beam path is used only in an incident light microscope in which the beams that travel to the object pass through the same hole array as the beams reflected from the object. It is therefore necessary to use an optical element referred to as an ocular to image the hole array in a plane in which it is observed or recorded. For the latter case, a video camera with a CCD receiver is mentioned, whose images can be stored and evaluated.

In the present invention on the other hand, the grid-shaped arrangement of the detector elements of the detector grid is used.

In contrast to the above-cited publication of Hamilton and the microscope known from U.S. Pat. No. 4,407,008, the solution according to the invention not only has the advantage that recording of a surface profile proceeds much more rapidly because of the simultaneous illumination of a plurality of object points, but a height-selective observation is also directly possible, since the confocal beam path means that the intensity of the radiation reflected from the individual object points depends directly on the heights of the locations in the object in question, so that each grid element provides information about the height of the surface at its point in the object and hence the intensity distribution over the surface provides a direct overview of the height distribution of the object surface. In particular, when the object is moved relative to the beam path in the direction of the optical axis, the areas with the same surface height can be determined very simply.

In objects with reflecting areas in or under a transparent layer, reflection profiles with a small maximum for the surface of the transparent layer and a large maximum for the reflecting area are obtained to show the dependence of intensity on depth in the object. Therefore it is possible with the device according to the invention to investigate not only surface profiles but also structures within or under transparent layers.

In one advantageous simple embodiment of the invention, the illumination grid is produced by holes in a layer which is illuminated by a light source. In order to achieve a higher intensity for the illuminated holes, hereinafter referred to as light dots for short, a lens array can be disposed in front of the layer with the holes, said array serving to ensure that the radiation from the light source does not illuminate the layer uniformly but is concentrated on the holes.

Normally the CCD receiver and the illumination grid are adjusted to one another in such fashion that the light dots imaged on the plane of the detector grid fall on photosensitive areas of the CCD receiver. In this case, during focusing, intensity maxima are obtained for those object points whose reflecting surfaces lie exactly in the focal plane.

It is also possible however to adjust the CCD receiver and the illumination grid with respect to one another in such fashion that the light dots imaged in the plane of the CCD receiver fall between the photosensitive areas of the CCD receiver. In this case, during focusing, intensity minima are created for those object points whose reflecting surfaces lie precisely in the focal plane. With a special design for the CCD receiver, for example with relatively small-area non-photosensitive areas between the pixels, this effect can be reinforced even further.

Finally, an inverse illumination grid is also possible; in other words the grid imaged in the focal plane and in the 15 plane conjugate to the focal plane does not consist of bright light dots but of a bright surface with a grid-shaped arrangement of small dark zones. An illumination grid of this kind, which consists for example of a layer illuminated by the light source with non-translucent zones, in the case of a CCD receiver with small photosensitive areas on which the dark zones are imaged, likewise yields intensity minima for those object points whose reflecting surfaces lie precisely in the focal plane.

In another advantageous embodiment, the illumination grid is produced by a lens array which images an approximately punctuate light source several times in a grid-shaped arrangement in an illumination plane.

In another advantageous embodiment, the illumination grid is produced by the fact that a diaphragm illuminated by a light source is imaged several times in a grid-shaped arrangement in an illumination plane. In this case also, an inverse illumination grid can be produced for example by virtue of the fact that the diaphragm has a center which is not translucent.

In an especially advantageous embodiment, the illumination grid is produced by a light source array. This can be composed for example of individual LEDs or produced by integrated technology. In both cases it is especially advantageous to design the arrays and their voltage supply in such a way that either each individual light source or a certain number of the light sources can be turned on and off independently of the others. The size of the illumination grid can then be varied and different depth resolutions can be set.

A variable illumination grid can also be produced by making the transmission of partial areas of the illumination grid variable. In addition, the illumination grid can be a liquid crystal matrix illuminated from behind.

To record the height-selective overviews described above, it is advantageous to provide an adjusting device which makes it possible to adjust the focal plane with the images of the light dots at different layer depths in the object.

To record complete reflection profiles with good resolution it is advantageous to provide an adjusting device which makes it possible to move the illumination grid and the object relative to one another in planes perpendicular to the optical axis so that the object is scanned with the illumination grid. The relative movement between the light dots and the object can then remain within the spacing of adjacent light dots or can be a multiple thereof. When using a variable illumination grid, rough scanning of the object can be performed on partial areas of the illumination grid that differ as a result of sequential switching.

In another advantageous embodiment of the invention the CCD receiver is connected to a computer which evaluates the signals from the CCD receiver. In this case it is advantageous to control the adjusting devices for the relative movement of light dots and the object with respect to one another in the direction of the optical axis and/or in the planes of the light dots or the object by using the computer.

In an especially preferred embodiment of the invention, a switching device is likewise controlled by the computer which turns different partial quantities of the light sources in the light source array on and off, or varies the transmission of different partial areas of the illumination grid. Thus for example the number of light sources that are switched on can be controlled by the results of the evaluation of the computer so that in critical areas of an object the amount of scattered light can be reduced by reducing the number of effective light sources.

It may be advantageous when scanning an object to displace the illumination grid and the CCD receiver really or virtually relative to one another in the illumination plane or in the plane of the diaphragm by a switching or adjusting device, which is advantageously controlled by the computer. By using a powerful computer, additional information can be obtained by this displacement which permits a more accurate evaluation. In this case, the grid size of the illumination grid should be larger than the grid size of the photosensitive areas of the CCD receiver.

A virtual displacement of the illumination grid and the detector grid can be accomplished for example by disposing a plane-parallel plate between the illumination grid and the detector grid, said plate being pivotable around an axis which is perpendicular to the optical axis. In the embodiment with a lens array, two light sources can be located side by side. The virtual displacement then takes place by switching between the light sources.

The displacement of illumination and observation grids permits a periodic change between the stage of adjustment in which the light dots are imaged on photosensitive areas and the adjustment state in which the light dots are imaged on nonphotosensitive intermediate spaces in the detector grid. Through the generation of a difference pixelwise, of two images recorded in the different states of adjustment in the computer, the confocal effect can then be intensified since the difference in the focused areas is especially great and is especially small in the defocused object areas.

For a depth of field which is as small as possible in the confocal image, it is advantageous instead of the usual circular telecentric diaphragm to provide an annular diaphragm. The use of such a diaphragm is known from EP-A2 0 244 640. In the latter, diaphragms with other transmission patterns are described which are also suitable for the present optical imaging system in order to adjust the three-dimensional transmission function to the known object pattern.

DESCRIPTION OF THE PREFERRED EMBODIMENT

The invention will now be described in greater detail with reference to the embodiments shown in FIGS. 1 to 8.

STRUCTURE AND OPERATION

Figure 1:
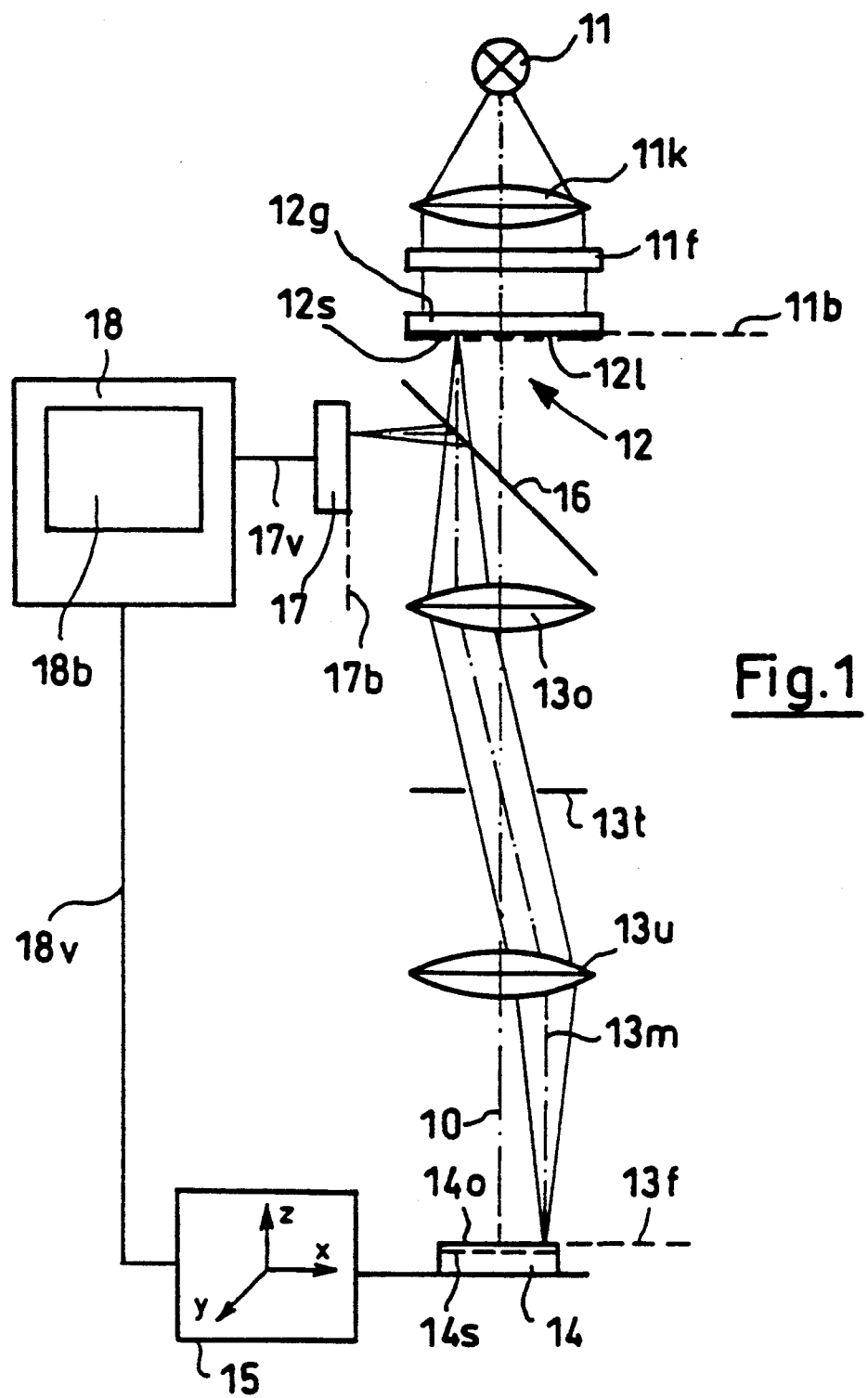
FIG. 1 is an embodiment in which the illumination grid is created by an illuminated layer with holes.

In FIG. 1, a light source (11), for example a halogen lamp which, with the aid of condenser (11k) and possibly a filter (11f) (to filter out a sufficiently narrow region of the spectrum), illuminates holes (12l) in a layer (12s). A layer of this kind can be made in known fashion from chromium for example on a glass plate (12g). Holes (12l) are arranged in layer (12s) in the same grid shape as the photosensitive areas of CCD receiver (17). For example if receiver 1 CX 022 made by Sony is used, then the layer will have 512×512 holes 11 microns apart in both directions of the grid and with a hole size of 2 microns×2 microns for example. The size of the holes is therefore much smaller than their spacing.

The illumination grid generated by illuminated holes (12l) in layer (12s) lies in illumination plane (11b). The latter is imaged by lenses (13o, 13u) in focal plane (13f) so that in the latter the object (14) is illuminated by light dots arranged in the form of a grid. The center-to-center spacing of the light dots is referred to as the illumination grid size. In the case of non-transparent objects, only surface (14o) can be illuminated, while in transparent objects layers (14s) inside can also be illuminated by the light dots. The light beams reflected by the object in focal plane (13f) are focused by lenses (13u, 13o) through a beam splitter (16) in diaphragm plane (17b). The diaphragms required for confocal arrangement are produced in the diaphragm plane (17b) by the photosensitive areas of the CCD receiver (17) which are separated from one another by spaces that are larger than the photosensitive areas.

Between the lenses (13o, 13u) a so-called telecentric diaphragm (13t) is usually located which ensures that the central beam (13m) strikes object (14) parallel to optical axis (10), so that the position of the light dots on the object does not change when object (14) is moved in the direction of optical axis (10).

Object (14) can be moved by an adjusting device (15) in all three directions in space, so that different layers (14s) of object (14) may be scanned. The movement in the x and y directions can be made smaller than the grid size of light dots (12) or of CCD receiver (17). Of course the movement of object (14) in the z direction can also be achieved by displacement of lenses (13o, 13u) in the direction of optical axis (10) and likewise instead of moving the object in the x and y directions, layer (12s) can be moved accordingly together with holes (12l) and CCD receiver (17).

The signals from CCD receiver (17) are transmitted through connecting lead (17v) to a computer (18) which handles evaluation and shows the results of the evaluation, for example in the form of graphs, on a screen (18b). Computer (18) can also control the displacement of focal plane (13f) in the object and scanning in the x and y directions through connecting lead (18v). This control can be present in the computer as a fixed program or can depend on the results of the evaluation.

Figure 2:
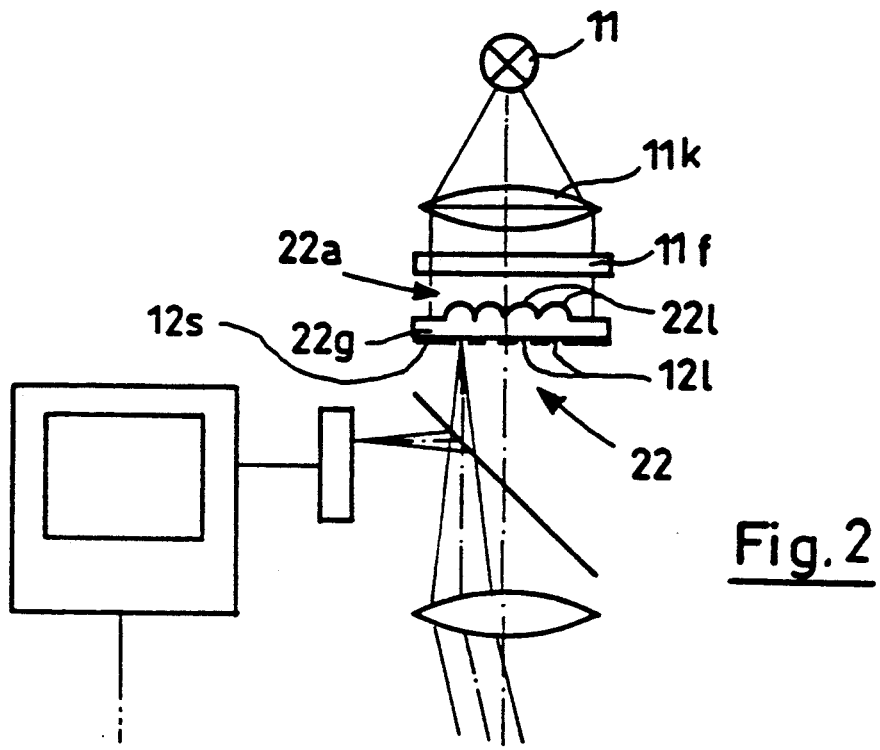
FIG. 2 is an embodiment in which the illumination of the holes is improved by an additional lens array.

In FIG. 2 a lens array (22a) is located between condenser (11k) and filter (11f) and layer (12s) with holes (12l), said array having the same number of small lenses (22l) as layer (12s) has holes (12l). Lenses (22l) have the task of imaging images of the helix of light from light source (11) in the holes and thus giving the light dots greater intensity.

Lens array (22a) and layer (12s) with holes (12l) can, as shown, be combined into a common part (22g). The manufacture of suitable lens arrays is known for example from a publication by K. Koizumi (SPIE, Vol. 1128, 74 (1989)).

Figure 3:
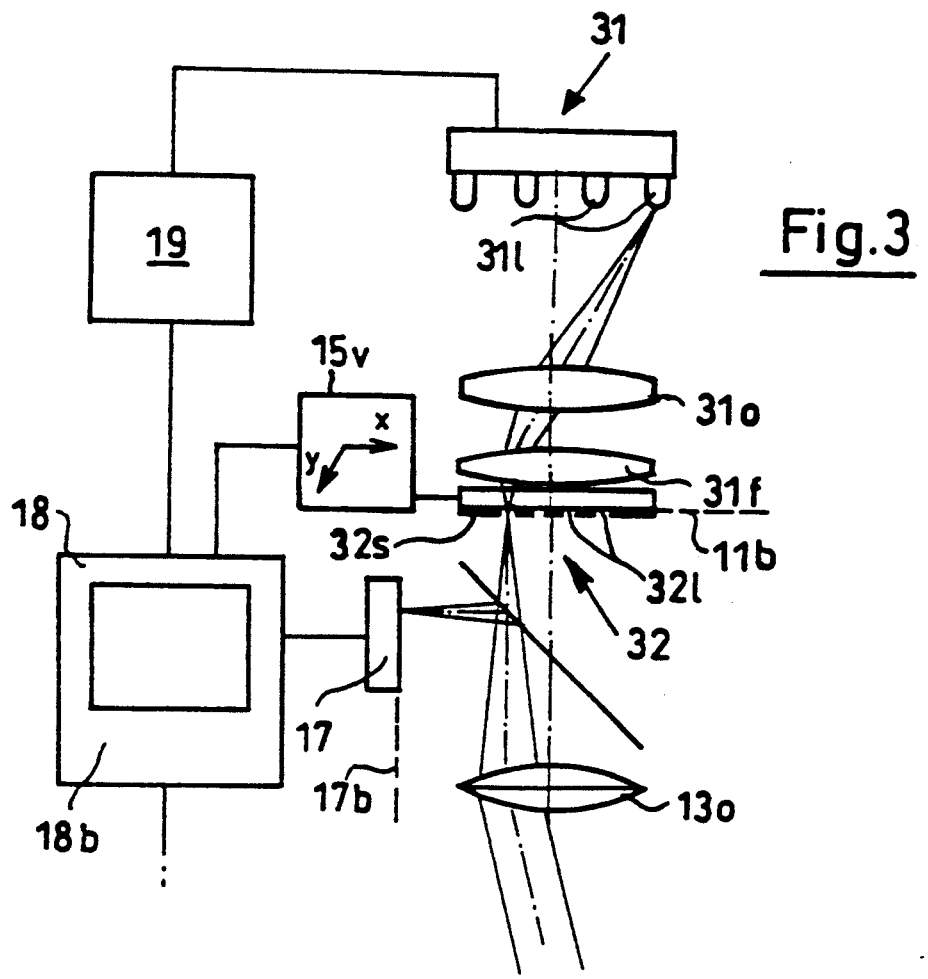
FIG. 3 is an embodiment in which the illumination grid is generated by a semiconductor array.

An especially advantageous embodiment of the illumination grid is shown in FIG. 3. In this figure, (31) refers to a light source array which can consist for example of light-emitting diodes (LEDs) (31l). An array of this kind measuring for example 10×10 diodes can be assembled for example from commercial Siemens LSU260-EO mini-diodes, with the diodes spaced 2.5 mm apart, and therefore has a total size of 2.5 cm×2.5 cm. On a scale of approximately 1:5 it is imaged in the illumination plane (11b) by lens (31o) in such a way that the image of the illumination grid occupies in the plane of the CCD receiver almost the same size as the entire photosensitive area of the CCD receiver namely 5 mm×5 mm. CCD receiver (17) in this case utilizes only 100 photosensitive areas with a spacing of approximately 0.5 mm×0.5 mm of the total available 512×512 detector elements. Nevertheless, the 100 light dots produce a considerable gain in time over scanning with only one light dot.

In this case also it can be advantageous to dispose a layer (32s) with holes (32l) in illumination plane (11b) so that the light dots have sufficiently small dimensions. Apart from lens (31o) for the reduced image, a field lens (31f) is advantageous for further imaging in the confocal beam path.

With a piezo drive (15v) layer (32s) can be displaced perpendicularly to the optical axis in the x and/or y direction so that alternately holes (32l) are imaged on photosensitive areas and on non-photosensitive intervals of CCD camera (17). In computer (18), then the difference of the light intensity of two images taken side by side is then calculated pixel by pixel. An increased confocal effect can be achieved in this manner.

It is much more advantageous to use integrated LED arrays for the illumination grid like those described for example in a publication by J.P. Donnelly (SPIE 1043, 92 (1989)). LED arrays of this kind, exactly like the array assembled from mini diodes, have the advantage that specific partial quantities of the LEDs can be turned off and on. In both cases the turning on and off is controlled by the computer (18) through switching device (19).

The confocal beam path shown in FIGS. 1 to 3 between illumination plane (11b), focal plane (13f) and diaphragm plane (17b) is only a special embodiment of a plurality of known confocal beam paths in which the invention can be used in a manner which is immediately obvious to the individual skilled in the art. In addition, in the beam path shown, an image of illumination plane (11b) in focal plane (13f) on a 1:1 scale is not necessary. Instead not only (as known from microscopes) is a reduction possible but an increase as well, for which reason the term microscope was not used in the title.

Figure 4:
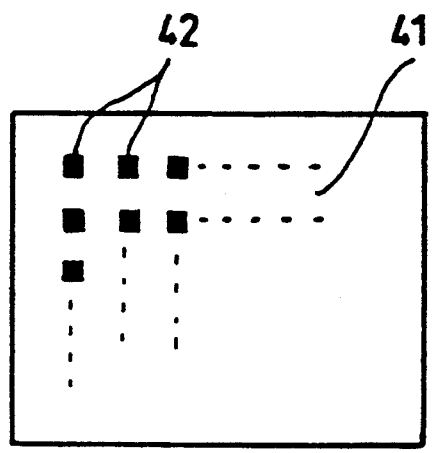
FIG. 4 is a glass plate with a pattern for an inverse illumination grid.

FIG. 4 shows a glass plate (41) for an inverse illumination grid. Here the layer mounted on the glass plate and not permeable to light consists only of small zones (42) which are separated from one another by relatively broad translucent areas.

Figure 5:
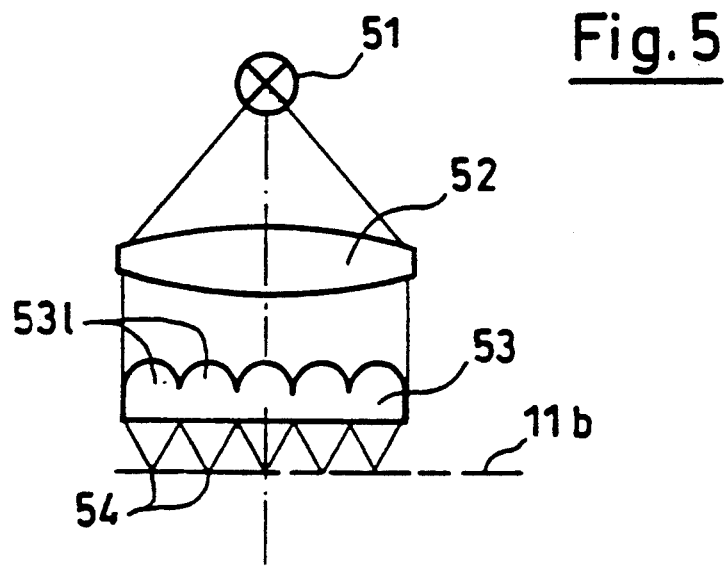
FIG. 5 is an arrangement for generating an illumination grid by multiple imaging of a light source with a lens array.

In FIG. 5, the illumination grid is generated by a lens array (53) which, as a result of the outstandingly good imaging properties of a nearly punctuate light source (51), produces a number of sufficiently small light dots (54) in illumination plane (11b). Condenser lens (52) ensures that lens array (53) is traversed by a parallel beam, so that each individual lens (53l) is optimally used.

Figure 6:
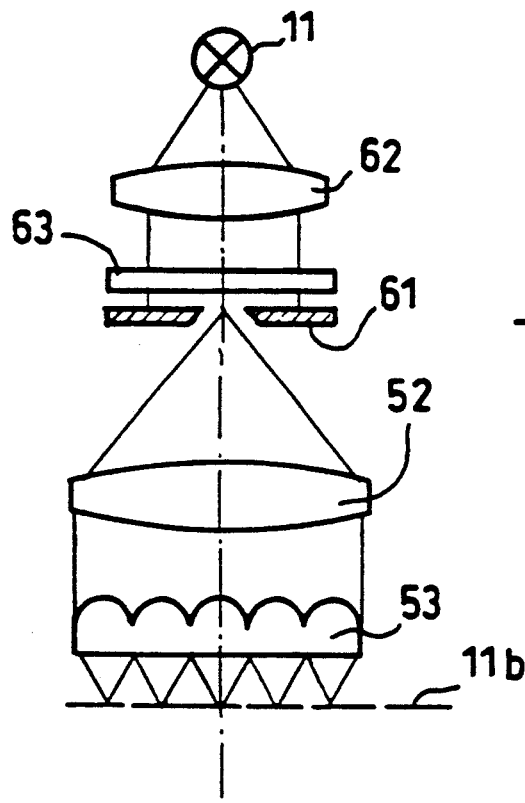
FIG. 6 is an arrangement to generate an illumination grid by multiple imaging of an illuminated diaphragm with a lens array.
Figure 7:
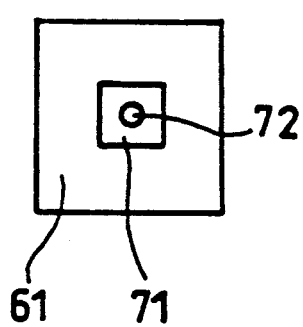
FIG. 7 is an example of the illuminated diaphragm in FIG. 6.

FIG. 6 shows an arrangement in which, by means of a lens array (53), a diaphragm (61) is imaged several times in illumination plane (11b). This diaphragm is illuminated through condenser (62) and scattering disk (63) by light source (11). A wide variety of embodiments is possible for the diaphragm. For example FIG. 7 shows a diaphragm (61) with a square boundary for translucent area (71) and an opaque center (72) for an inverse illumination grid. Of course, diaphragms for an illumination grid made of light dots, etc. is also possible.

Figure 8:
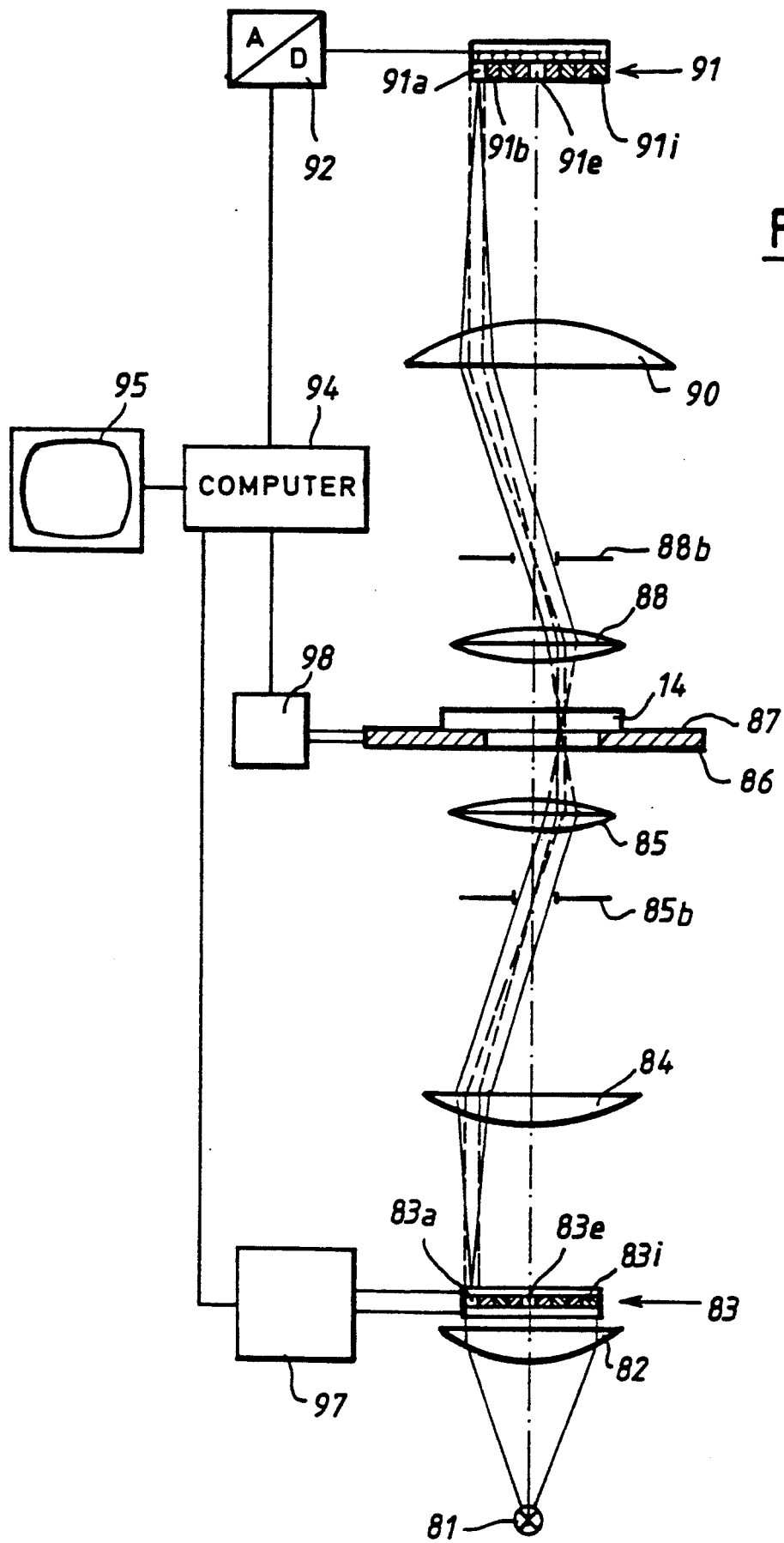
FIG. 8 is an arrangement with a liquid crystal matrix as the illumination grid in transmitted light.

In the embodiment shown in FIG. 8 a confocal scanning microscope is shown. It contains, as the illumination grid, a liquid crystal display (83). The transmission of the partial areas (83a–i) of the liquid crystal display, of which only nine partial areas are shown here, is addressably variable by an electronic switching device (97).

Liquid crystal display (83) is illuminated from the rear by a light source (81) and a collector (82). Illumination grid (83) is imaged, reduced, in focal plane (87) by an intermediate lens (84) and a condenser (85). The entrance pupil (85b) of the condenser serves as a telecentering diaphragm here.

As far as observation is concerned, the image of the liquid crystal display located in focal plane (87) is imaged by a lens (88) and a tube lens (90) telecentrically on a CCD receiver (91). Here exit pupil (88b) of lens (88) serves as a telecentering diaphragm.

The images recorded by CCD receiver (91) are read after digitization in an analog/digital converter into a computer (94) and processed.

In the case illustrated, only two partial areas (83a, 83e) of liquid crystal display (83) are switched to high transmission. Accordingly, in focal plane (87) only two light spots are generated and only the two detector elements (91a, 91e), which are assigned to the two partial areas (83a, 83e) imagewise, receive scattered light in focal plane (87). The remaining detector elements (91b–d, 91f–i) act as confocal diaphragms with their signals being not considered or considered separately in the expansion of the image.

Object (14) can now be scanned in focal plane (87) by virtue of the fact that partial areas which differ from one another (83a–i) of liquid crystal display (83) or different combinations of partial areas (83a–i) are switched to high transmission and then the signals from detector elements (91a–i) associated with partial areas (83a–i) that have been switched on are taken into account in the evaluation. For this addressable control of partial areas (83a–i), computer (94) is connected to switching device (97). The total image which is then assembled from a plurality of individual images is then displayed on a monitor (95).

Furthermore, object table (86) is displaceable by a control device (98), itself controlled in turn by computer (94), in three mutually perpendicular directions in space. Through delicate displacement of object table (86) parallel to focal plane (87), images with a very high lateral resolution can be recorded. The displacement of object table (86) parallel to the optical axis serves to record different depth slices of object (14).

In this embodiment only the detector grid size, in other words the center-to-center distance of detector elements (91a–i), is fixed. On the other hand, the illumination grid size in the focal plane can be varied by computer (94) and switching device (97) and depends on how many partial areas (83a–i) of display (83) are simultaneously switched to high transmission. Therefore the confocal effect can vary as a function of the measurement conditions. Thus for example, to generate overviews, all the partial areas (83a–i) can be switched to high transmission. The image recorded by CCD sensor (91) then corresponds to a normal bright-field image. However it is also possible to adjust the different distances of the partial areas (83a–i) that are switched to high transmission. In this case the confocal effect varies within the image field.

In FIG. 8, for reasons of clarity, only nine partial areas (83a–i) of the display and nine associated detector elements (91a–i) are shown. It is clear that both the display and the receiver (91) can have many more two-dimensionally arranged partial areas or detector elements.

In the embodiments described with reference to the drawings the light always has the same wavelength as far as illumination and observation are concerned. The device according to the invention can however also be used advantageously for fluorescence measurements. For this purpose, suitable color filters can be placed in front of the detector grid which pass only the fluorescent light from the object and block the light projected onto the object.

Other embodiments are within the following claims.

What is claimed is:

1. An apparatus for performing a three-dimensional examination of an object, said apparatus comprising:

an illumination grid simultaneously generating several separate light spots or shadow zones;

a detector grid which includes a plurality of independent detector elements, whose center-to-center distances define a detector grid size;

imaging optical elements having a focal plane, said object being positioned in said focal plane, wherein said imaging optical elements image said illumination grid into said focal plane to generate several separate light spots or shadow zones in said focal plane whose center-to-center distances define an illumination grid size, wherein said imaging optical elements image the focal plane on the detector grid, wherein either the image of the illumination grid size in the plane of the detector grid is larger than the detector grid size or the detector grid size is larger than the diameters and/or edge lengths of the photosensitive surfaces of the individual detector elements, and wherein the object is examined simultaneously at a large number of object points according to said separate light spots or shadow zones.

2. The apparatus of claim 1 wherein the detector grid size equals at least twice the diameter or edge length of the photosensitive areas of the individual detector elements of the detector grid.

3. The apparatus of claim 2 wherein the detector grid is a CCD sensor.

4. The apparatus of claim 1 wherein the illuminating grid size in the plane of the detector grid is equal to at least twice the detector grid size.

5. The apparatus of claim 1 wherein the illumination grid includes holes in a layer, illuminated by a light source.

6. The apparatus of claim 5 further comprising a lens array for illuminating said holes.

7. The apparatus of claim 1 wherein the illuminating grid includes a layer of opaque zones illuminated by a light source.

8. The apparatus of claim 1 wherein the illumination grid is generated by a lens array which images a light source multiple times in a grid arrangement on an illuminating plane.

9. The apparatus of claim 1 wherein the illuminating grid is generated by a lens array which images a diaphragm illuminated by a light source multiple times in a grid-shaped arrangement on an illumination plane.

10. The apparatus of claim 9 wherein the diaphragm has an opaque center.

11. The apparatus of claim 1 wherein the illuminating grid size is variable.

12. The apparatus of claim 11 wherein the illuminating grid contains a light source array.

13. The apparatus of claim 12 wherein the light source of the light source array are capable of being turned on or off individually or in partial numbers.

14. The apparatus of claim 11 wherein the transmission of partial areas of illumination grid being variable individually or in partial numbers.

15. The apparatus of claim 11 further comprising an electronic switching device to vary the size of the illumination grid.

16. The apparatus of claim 1 wherein the focal plane is adjustable to various layers of said object through an adjusting device and/or through the illumination grid and object being movable relative to one another in planes perpendicular to an optical axis of the optical elements.

17. The apparatus of claim 3 wherein the CCD receiver is connected with a computer in which the signals of the CCD receiver are evaluated.

18. The apparatus of claim 17 wherein said computer is connected with an adjusting device, by which the adjustment of focal plane on various layers of object and/or the movement of illumination grid and object relative to one another is controllable by computer.

19. The apparatus of claim 18 wherein said computer is connected to a switching device, by which the light sources of the light source array can be switched on and off individually or in partial numbers as a function of the result of the computer evaluation, by the computer.

20. The apparatus of claim 17 wherein the computer is being connected with a switching or adjusting device, by which the illumination grid and the CCD receiver are displaceable relative to one another in their respective planes.

21. The apparatus of claim 1 further comprising a telecentric diaphragm is provided in the confocal beam path, said diaphragm being made annular and/or having a transmission pattern.

22. An apparatus for performing a three-dimensional examination of an object, said apparatus comprising:

an illuminating grid simultaneously generating several separate light spots or shadow zones;

a detector grid which includes a plurality of independent detector elements, whose center-to-center distances define a detector grid size;

imaging optical elements having a focal plane, said object being positioned in said focal plane, wherein said imaging optical elements image said illuminating grid into said focal plane to generate several separate light spots or shadow zones in said focal plane whose center-to-center distances define an illuminating grid size, wherein said imaging optical elements image the focal plane on the detector grid, wherein either the image of the illuminating grid size in the plane of the detector grid is larger than the detector grid size or the detector grid size is larger than the diameters and/or edge lengths of the photosensitive surfaces of the individual detector elements, and wherein the object is examined simultaneously at a large number of object points according to said separate light spots or shadow zones, wherein the detector grid size equals at least twice the diameter or edge length of the photosensitive areas of the individual detector elements of the detector grid or the image of the illumination grid size in the plane of the detector grid equals at least twice the detector grid size.

23. The apparatus of claim 22 wherein the detector grid is a CCD sensor.

24. The apparatus of claim 22 wherein the illumination grid includes holes in a layer, illuminated by a light source.

25. The apparatus of claim 24 further comprising a lens array for illuminating said holes.

26. The apparatus of claim 22 wherein the illumination grid includes a layer of opaque zones illuminated by a light source.

27. The apparatus of claim 22 wherein the illumination grid is generated by a lens array which images a light source multiple times in a grid arrangement on an illumination plane.

28. The apparatus of claim 22 wherein the illumination grid is generated by a lens array which images a diaphragm illuminated by a light source multiple times in a grid-shaped arrangement on an illumination plane.

29. The apparatus of claim 28 wherein the diaphragm has an opaque center.

30. The apparatus of claim of claim 22 wherein the illumination grid size is variable.

31. The apparatus of claim 30 wherein the illumination grid contains a light source array.

* * * * *